United States Patent
Morein et al.

(10) Patent No.: US 8,161,209 B2
(45) Date of Patent: Apr. 17, 2012

(54) PEER-TO-PEER SPECIAL PURPOSE PROCESSOR ARCHITECTURE AND METHOD

(75) Inventors: Stephen Morein, San Jose, CA (US); Mark S. Grossman, Palo Alto, CA (US); Warren Fritz Kruger, Sunnyvale, CA (US); Brian Etscheid, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 12/184,197

(22) Filed: Jul. 31, 2008

(65) Prior Publication Data
US 2009/0248941 A1    Oct. 1, 2009

Related U.S. Application Data

(60) Provisional application No. 61/041,210, filed on Mar. 31, 2008.

(51) Int. Cl.
*G06F 3/00* (2006.01)
(52) U.S. Cl. .......... 710/38; 710/107; 710/305; 710/306; 709/235; 340/2.1; 345/505; 345/537
(58) Field of Classification Search ....... 710/38, 710/306, 107, 305, 311, 312, 316; 709/235; 340/2.1; 345/501, 502, 503, 504, 505, 536, 345/537
See application file for complete search history.

(56) References Cited

U.S. PATENT DOCUMENTS

| | | | |
|---|---|---|---|
| 4,570,257 A * | 2/1986 | Olson et al. ......... | 370/216 |
| 4,627,045 A * | 12/1986 | Olson et al. ......... | 370/225 |
| 5,745,913 A * | 4/1998 | Pattin et al. ......... | 711/105 |
| 6,359,624 B1 * | 3/2002 | Kunimatsu ......... | 345/503 |
| 6,473,086 B1 * | 10/2002 | Morein et al. ....... | 345/505 |
| 6,587,905 B1 * | 7/2003 | Correale et al. ..... | 710/107 |
| 6,606,614 B1 * | 8/2003 | Paillet et al. ........ | 706/41 |
| 6,802,021 B1 * | 10/2004 | Cheng et al. ........ | 714/4 |
| 6,874,042 B2 * | 3/2005 | Sauber ............... | 710/38 |
| 6,956,579 B1 * | 10/2005 | Diard et al. ........ | 345/537 |
| 7,095,415 B2 * | 8/2006 | Chang et al. ........ | 345/520 |
| 7,289,125 B2 * | 10/2007 | Diard et al. ........ | 345/501 |
| 7,325,086 B2 * | 1/2008 | Kong et al. ......... | 710/307 |
| 7,340,557 B2 * | 3/2008 | Kong et al. ......... | 710/316 |
| 7,412,554 B2 * | 8/2008 | Danilak ............. | 710/305 |
| 7,477,256 B1 * | 1/2009 | Johnson ............ | 345/504 |
| 7,500,041 B2 * | 3/2009 | Danilak ............. | 710/305 |
| 7,535,433 B2 * | 5/2009 | Ledebohm et al. .... | 345/1.1 |

(Continued)

OTHER PUBLICATIONS

Qin et al. Dynamic Load Balancing for I/O- and Memory-Intensive Workload in Clusters Using a Feedback Control Mechanism. Springer Berlin/Heidelberg. Jun. 1, 2004.*
Miyazaki, Jun. On Access Path Selection of Queries in Main Memory Database Using a Functional Memory System. IADIS. 2007.*
Bavier, Eric. CUDA on Multiple GPUs. Oct. 29, 2010.*
Spafford et al. Quantifying NUMA and Contention Effects in Multi-GPU Systems. ACM. 2011.*

(Continued)

*Primary Examiner* — Matthew Spittle
(74) *Attorney, Agent, or Firm* — Volpe and Koenig, P.C.

(57) ABSTRACT

A peer-to-peer special purpose processor architecture and method is described. Embodiments include a plurality of special purpose processors coupled to a central processing unit via a host bridge bus, a direct bus directly coupling each of the plurality of special purpose processors to at least one other of the plurality of special purpose processors and a memory controller coupled to the plurality of special purpose processors, wherein the at least one memory controller determines whether to transmit data via the host bus or the direct bus, and whether to receive data via the host bus or the direct bus.

21 Claims, 7 Drawing Sheets

U.S. PATENT DOCUMENTS

| | | | | |
|---|---|---|---|---|
| 7,562,174 B2 * | 7/2009 | Danilak | ......................... | 710/305 |
| 7,576,745 B1 * | 8/2009 | de Waal et al. | ................ | 345/502 |
| 7,598,958 B1 * | 10/2009 | Kelleher | ........................ | 345/504 |
| 7,617,348 B2 * | 11/2009 | Danilak | ......................... | 710/305 |
| 2005/0140682 A1 * | 6/2005 | Sumanaweera et al. | ....... | 345/506 |

OTHER PUBLICATIONS

Spampinato, Daniele. Modeling Communication on Multi-GPU Systems. Jul. 2009.*

* cited by examiner

500

CPU view

GPU0 view

GPU1 view

GPU0 view of system space

GPU1 LVM mapping w/o offset

GPU1 LVM mapping w/o offset

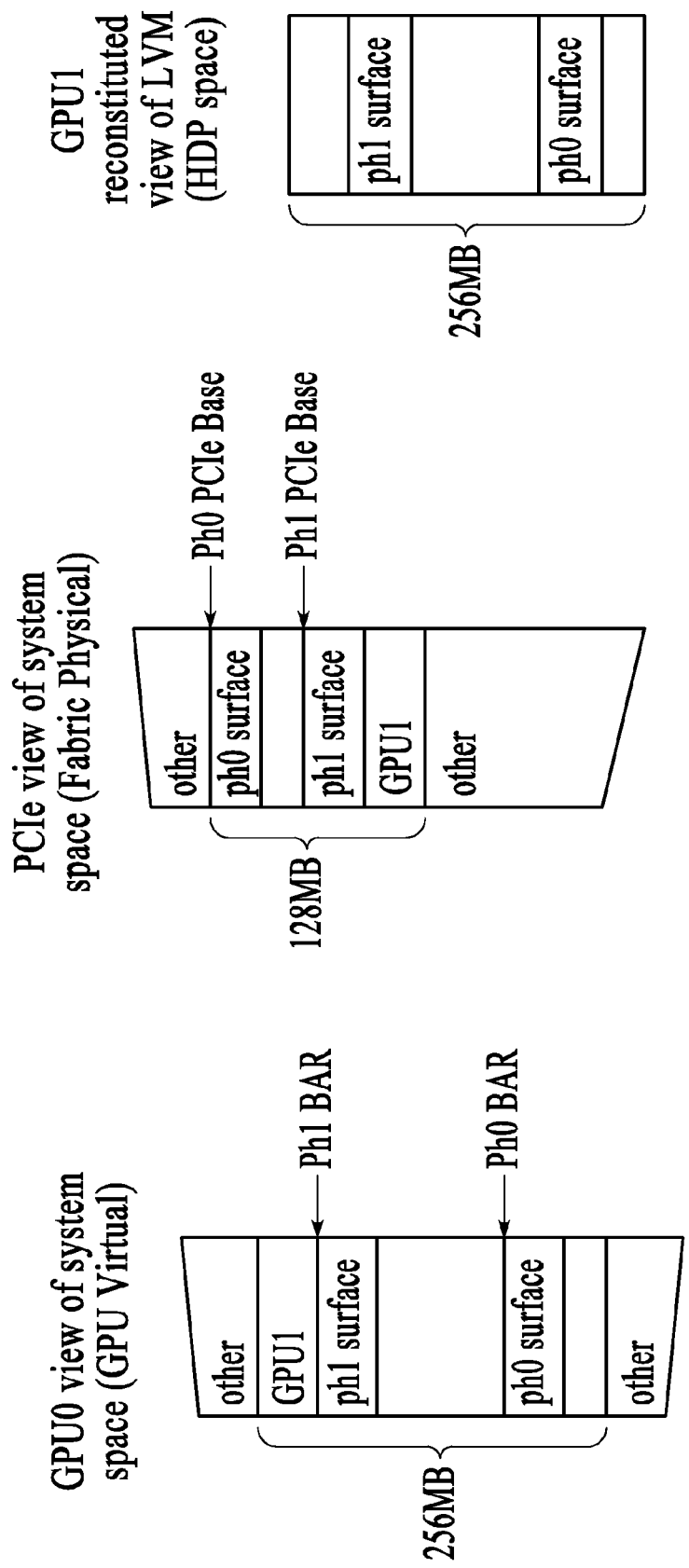

PEER-TO-PEER SPECIAL PURPOSE PROCESSOR ARCHITECTURE AND METHOD

RELATED APPLICATIONS

This application claims priority from U.S. Provisional Patent Application No. 61/041,210, filed Mar. 31, 2008, which is incorporated by reference in its entirety herein.

TECHNICAL FIELD

The invention is in the field of data transfer in computer and other digital systems.

BACKGROUND

As computer and other digital systems become more complex and more capable, methods and hardware to enhance the transfer of data between system components or elements continually evolve. Data to be transferred include signals representing data, commands, or any other signals. Speed and efficiency of data transfer is particularly critical in systems that run very data-intensive applications, such as graphics applications. In typical systems, graphics processing capability is provided as a part of the central processing unit (CPU) capability, or provided by a separate special purpose processor such as a graphics processing unit (GPU) that communicates with the CPU and assists in processing graphics data for applications such as video games, etc. One or more GPUs may be included in a system. In conventional multi-GPU systems, a bridged host interface (for example a peripheral component interface express (PCIe®)) interface must share bandwidth with host traffic. FIG. 1 is a block diagram of a prior art system 100 that includes a root processor 108 (such as a CPU), a bridge 106, and two endpoints EP0 104a and EP1 104b (such as GPU0 and GPU1). Each endpoint 104 is coupled to a respective memory component 102a and 102b.

In order to take advantage of the existence of more than one GPU in a system, the multiple GPUs share processing tasks, which requires transfer of data between them. A challenge in achieving good performance scaling in a multi-GPU system is that there is potentially a lot of data that must go back and forth between the GPUs. In an example situation, the application calls for the drawing of a background or some other texture that requires a lot of time to draw. It would be desirable to copy the background or other texture to another GPU so that it can be used in the next frame or another part of the same frame. In system 100, the only path for data transfer between GPUs 104 is through respective paths 105a and 105b to the bridge 106. The path into the root 108 must carry the traffic from each GPU 104 to the root 108, as well as the traffic between the two GPUs 104. This can create a bottleneck because the physical wires are being shared.

BRIEF DESCRIPTION OF THE DRAWINGS

FIG. 7A is a CPU view, FIG. 7B is a GPU0 view, and FIG. 7C is a GPU1 view.

FIG. 8A is a GPU0 view, FIG. 8B is a GPU1 LVM mapping without offset, and FIG. 8C is a GPU1 mapping with offset.

FIGS. 9A-9C show an example of phase compression where FIG. 9A is a GPU0 view of system memory space, FIG. 9B is a PCIe view of memory space, and FIG. 9C is a GPU1 reconstituted view of LVM.

DETAILED DESCRIPTION

Embodiments of peer-to-peer special purpose processor architecture and method are described herein. Embodiments include a system with multiple special purpose processors coupled to the at least one central processing unit via a host bridge bus. A direct bus directly couples each of the multiple special purpose processors to at least one other of the multiple special purpose processors. A memory controller is coupled to the multiple special purpose processors, and the memory controller determines whether to transmit data via the host bus or the direct bus.

Figure 1:
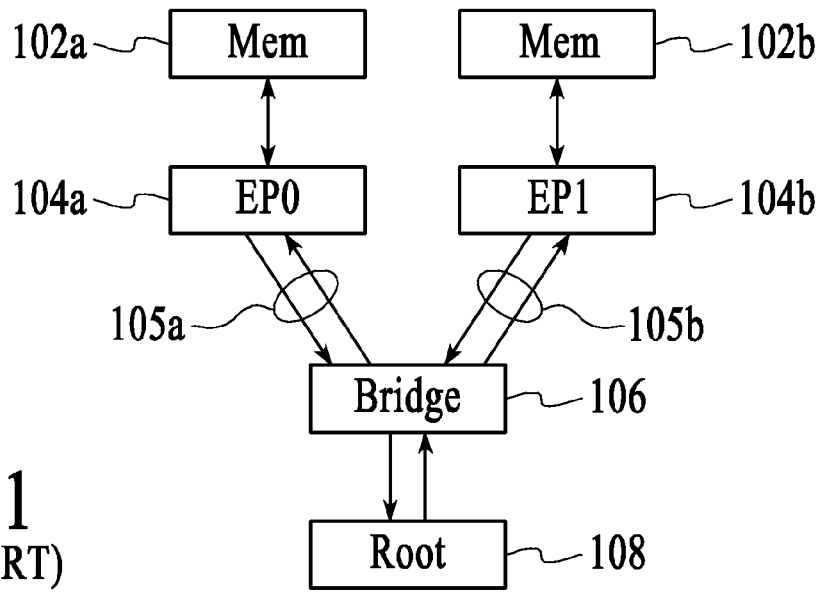
FIG. 1 is a block diagram of a prior art multi-processor system.
Figure 2:
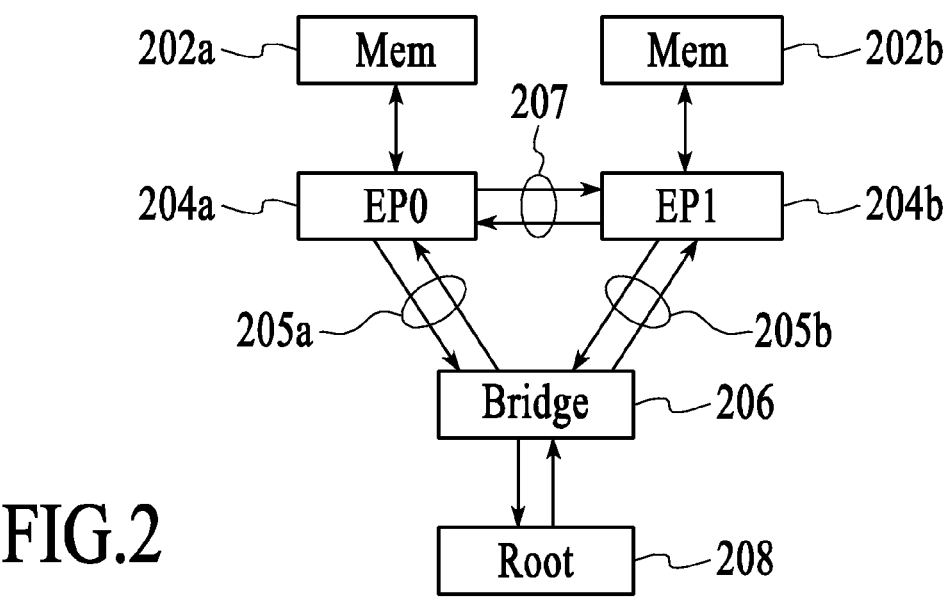
FIG. 2 is a block diagram of portions of a multi-processor system with added peer-to-peer IO path, according to an embodiment.

FIG. 2 is a block diagram of portions of a multi-processor system 200 according to an embodiment. System 200 includes a root processor 208 coupled to a bridge 026. The bridge 206 is coupled via respective buses 205a and 205b to bus endpoints EP0 204a and EP1 204b. Each of endpoints 204 is coupled to a respective memory device 202a or 202b.

In an embodiment, root processor 208 is a CPU and each of endpoints 204 are GPUs, but embodiments are not so limited. As described further below, embodiments include endpoint 204 that are each GPUs with sideports that are similar to PCIe® ports. PCIe® addressing features, and various load balancing features are used in the architecture of system 200 to improve performance. In typical architectures, Read operations from one GPU to another are particularly expensive. For Read operations, a request is sent, and some time later you get the requested data is received. Embodiments provide an improvement over typical performance for operations, including Read operations.

Figure 3:
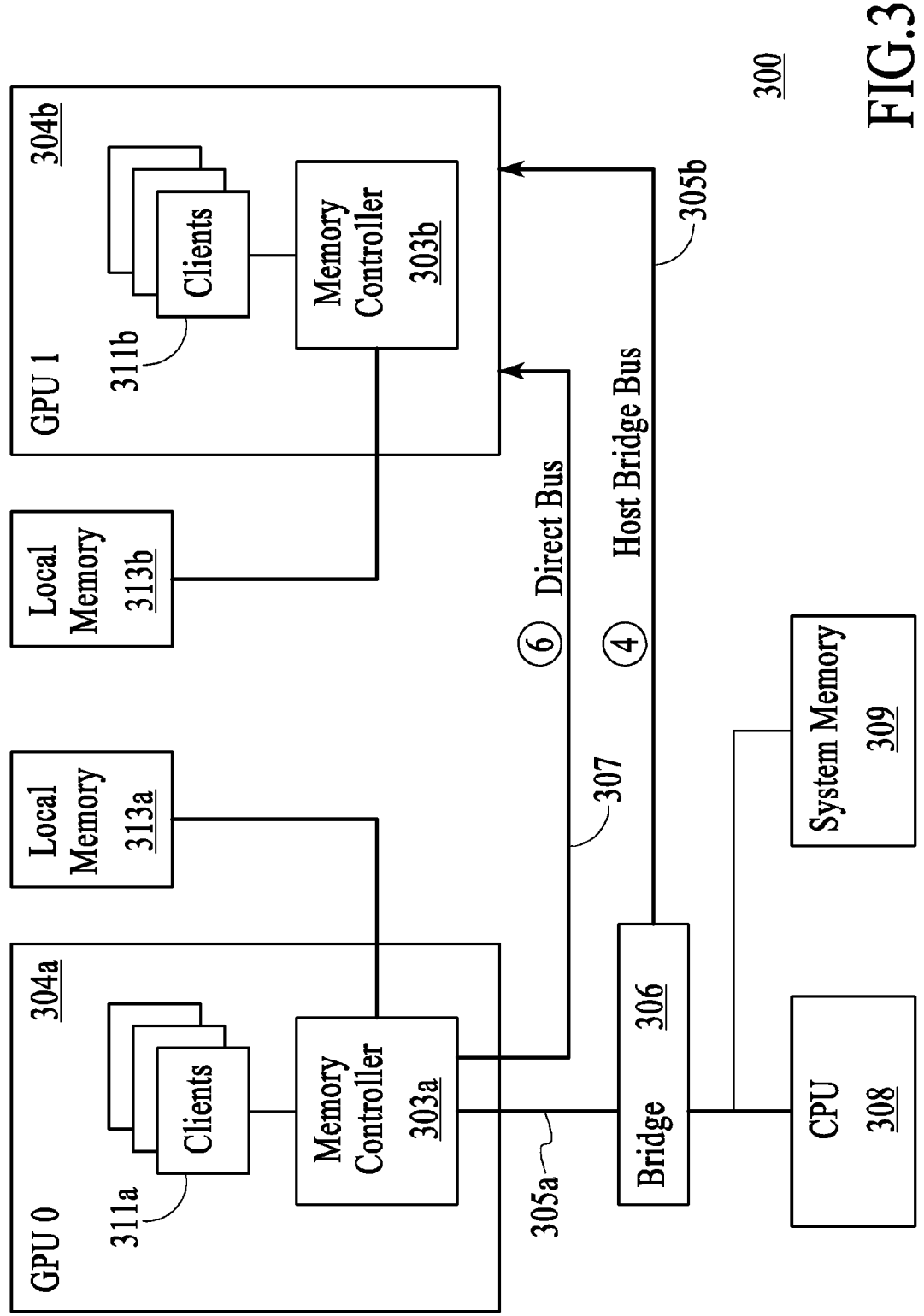
FIG. 3 is a more detailed block diagram of a multi-processor system with added peer-to-peer IO path, according to an embodiment.

FIG. 3 is a block diagram of a multi-processor system 300 according to an embodiment. System 300 is similar to system 200, but more detail is shown. A CPU 308 is a root processor of the system 300. A bridge 306 couples the CPU 308 to a system memory 309. The bridge 306 also couples the CPU 308 to a GPU0 304a via a host bridge bus 305a, and to a GPU1 304b via a host bridge bus 305b.

GPUs 304 are coupled to each other via a direct bus 307 through respective side ports. GPUs 304 are each further coupled to respective local memories 313a and 313b via separate respective ports. GPU0 304a includes various clients 311a. The clients 311a communicate with a memory controller 303a. The memory controller 303a controls access to local memory 313a (for example a video memory), by clients 311, and controls access to bus 305a by clients 311. More specifically, the memory controller 303a determines which clients 311 communicate with local memory 313a and which clients 311 communicate with bus 305a and when.

GPU1 304b similarly includes various clients 311b coupled to a memory controller 303b. Memory controller 303b communicated with the local memory 313b. GPU0 304a and GPU1 304b are coupled to each other by a direct bus 307. Direct bus 307 is a peer-to-peer path between novel side ports of GPUs 304.

In an embodiment, access to various buses by clients 311 is determined by address range. Access to memories 309 and 313 is based on the address range. In an embodiment, memory address space is divided up into three sections: a section for system memory 309, a section for local memory 313a, and a section for local memory 313b. Memory 313a is a peer memory from the perspective of GPU 304b, and vice versa. Peer addresses are those that refer to a memory on another GPU. Access to local memory is handled by the bridge 306 in a typical manner. In an embodiment, when addresses fall in the peer address range, both available paths (direct bus 307 and host bridge buses 305) are used. The amount of data sent via one path or another depends on various conditions in different embodiments. For example, according to one mode, data is divided evenly among both paths; 50% of the data being sent by bus 307, and 50% of the data being sent by bus 305. This mode provides improved performance that would not be possible with conventional architectures. However, as will be appreciated by those of ordinary skill, bus 305 is still being shared by other traffic (in addition to the data being transmitted as described above). For this reason, dynamic load balancing can also be used in this mode to improve performance yet further. For example, the direct path (using direct bus 307) can be a preferred path, but when that path is full, the other path (using, for example, paths 305a and 305b) is used. However, consider the following situation. Assuming a sequence of Write data ("W", and where WA denotes "Write to memory address/location A"):

1. WA to GPU0 via 305; (where the data=4 as shown in FIG. 3)
2. WB to GPU0;
3. WC to GPU0;
4. WA to GPU0; via 307; (where the data=6 as shown in FIG. 3)

Where the data written is desired to be "6". The write of "4" occurred first in the sequence described above, but via the host bridge bus 305a and 305b. The write of "6"started later but went via the direct bus 307 (the faster way). "6" is written first, but "4"arrives later and overwrites "6". If such a problem is anticipated, a mode that avoids the problem is address-based routing. Addresses can be divided so that data for the same address will be sent on the same route. For example, even doubleword addresses may be sent via direct path 307 and odd doubleword addresses sent via host bridge path 305a and 305b. Alternatively, seven out of eight addresses (those not ending with 000 binary) may be sent via direct path 307 and the rest sent via host bridge path 305a and 305b.

According to another mode, all data is sent via one path or the other. This mode would not be the most desirable because one path would not be used. However, each of multiple clients 311a and 311b may be allowed its own rules. In this way it is possible to have multiple graphics hardware functions with different uses of the different paths, and full utilization of paths is realized.

Figure 4:
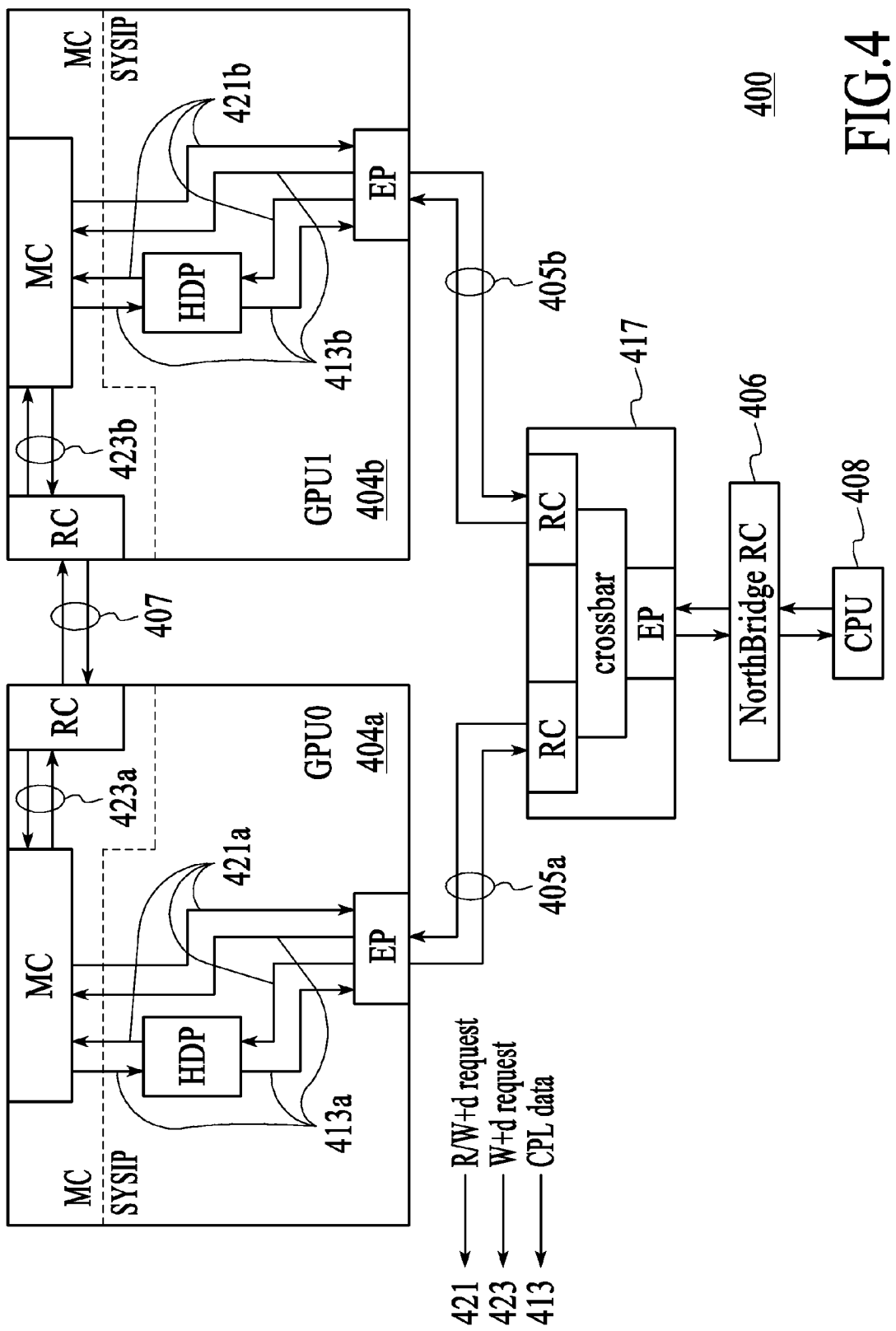
FIG. 4 is a flow diagram of a method performed by the IO system, according to an embodiment.

In embodiments as described in more detail below, Write operations are discussed. That is GPU0 304a pushes data to GPU1 304b, but does not pull data back from GPU1 304b. However, Read and Write operations are practicable in either direction in other embodiments according to the same methods described herein FIG. 4 is a block diagram of elements of a two-GPU system 400 according to an embodiment. FIG. 4 includes an overall graphics subsystem interconnect according to an embodiment (not showing a display link for transferring displayable pixels to a motherboard or display device). System 400 includes a GPU0 404a and a GPU1 404b. GPUs 404 are coupled to each other directly via a direct bus 407 and respective side ports. Blocks labeled "RC" are configured as root complex cores. Blocks labeled "EP"are endpoint configured. Note that RC and EP are common terminology for PCI Express (PCIe®) ports. For proper communication an RC must talk to EPs and not to another RC. In an embodiment that provides a peer to peer implementation that works with a common port design, strapping logic is included for allowing either the "RC" in 404a or the "RC" in 404b to act as the true RC and the other to act as an EP. Each of GPUs 404 include a memory controller (MC), and a host data path block (HDP). As shown in the legend, communication paths 421 are Read/Write (R/W)+d request paths, where "W+d" means "write request plus data". "CPL data" arrows 413 show paths for read completions with data. Arrows 423 indicate W+d request paths. Host PCIe® interfaces to other GPU internal blocks such as internal registers, Read Only Memory (ROM), audio, and Video Graphics Array/Adapter (VGA) are not shown.

GPUs 404 are further coupled to a bridge 406 (a North-Bridge in this embodiment) through crossbar 417 via respective host bridge buses 405a and 405b. A CPU 408 is coupled to the bridge 406.

Figure 5:
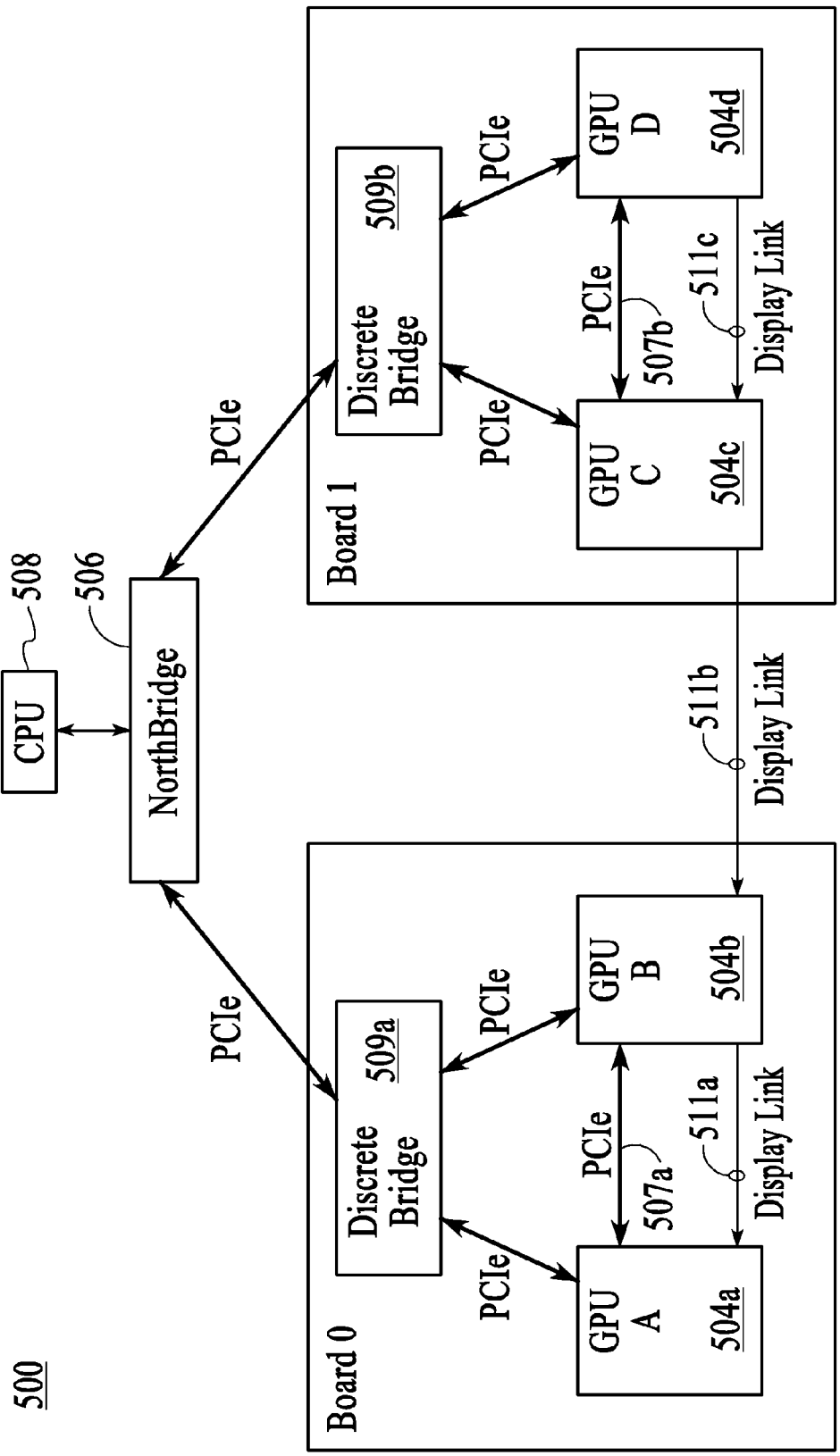
FIG. 5 is a flowchart that illustrates a method of communicating phase information to in an asymmetrical IO system, according to an embodiment.

FIG. 5 is a block diagram of a 4-GPU system according to an embodiment. In an embodiment, two GPUs GPUA 404a and GPUB 404b occupy one board (board 0), and two additional GPUs, GPUC 504c and GPUD 504d occupy another board (board 1). GPU 504a and GPU 504b are coupled via a direct bus 507a and a display link 511a. GPU 504a and GPU 504b are each coupled to a discrete bridge 509a through respective PCIe® buses.

GPUs GPUC 504c and GPUD 504d are coupled via a direct bus 507b and a display link 511c. GPU 504c and GPU 504d are each coupled to a discrete bridge 509b through respective PCIe® buses.

Board 0 and board 1 are coupled by a display link 511b. Board 0 and board 1 are further coupled through a bridge 506 via a PCIe® bus from discrete bridge 509a to the bridge 506 and by another PCIe® bus from discrete bridge 509b to the bridge 506. A CPU 508 is coupled to the bridge 506. Peer to peer transfers are possible simultaneously between any pair of GPUs in system 500. In an embodiment, if the pairs are AB and CD, each transfer is performed at approximately 12.2 GB/sec max sustained. If the pairs are AC and BD or AD and BC and the transfers are in opposite directions, each transfer is performed at approximately 6.1 GB/sec. If the pairs are AC and BD or AD and BC and the transfers are in the same direction, each transfer is performed at approximately 3 GB/sec.

Figure 6:
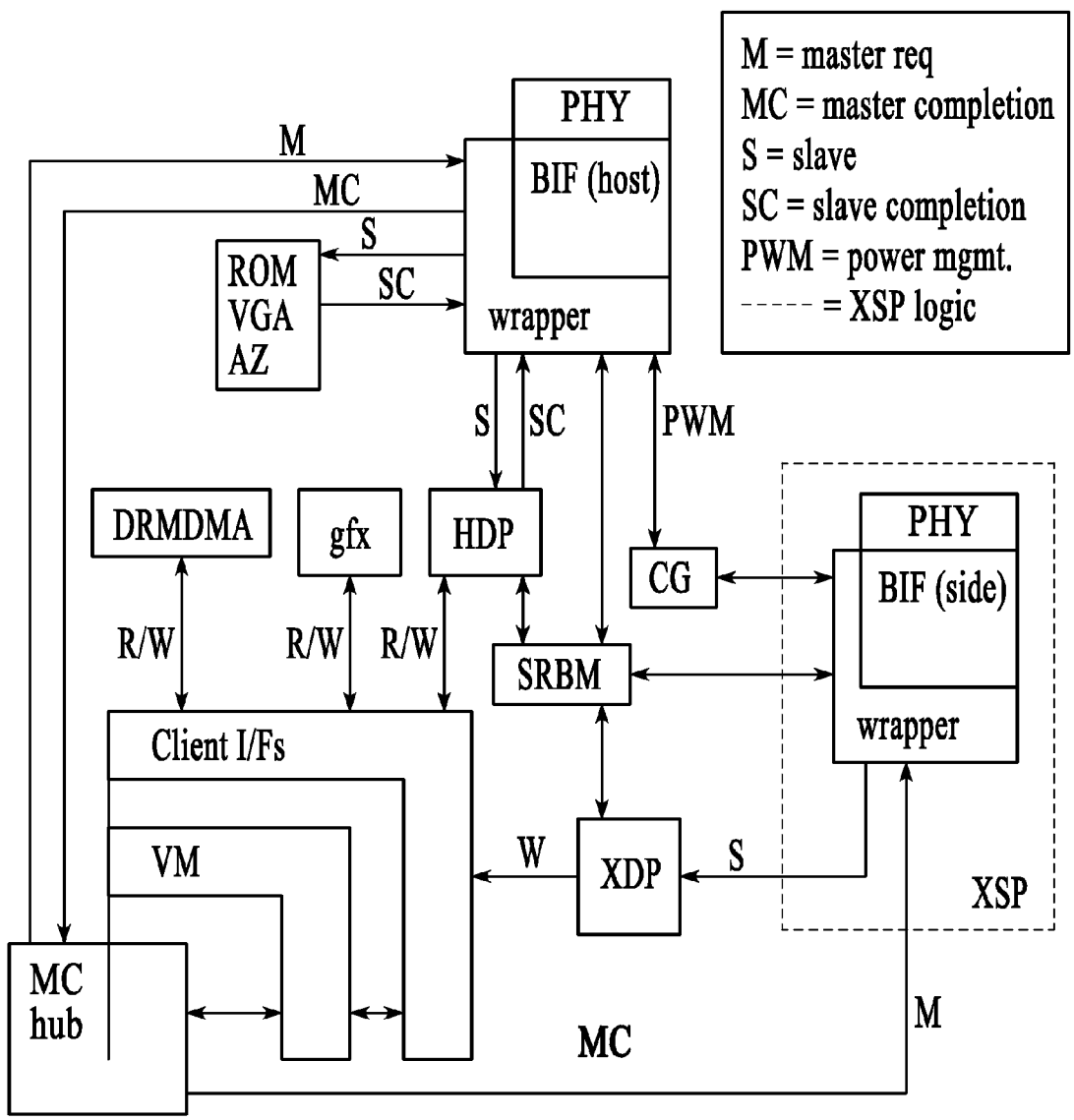
FIG. 6 is a timing diagram that illustrates the communication of client phase information to a host device in an asymmetrical IO system, according to an embodiment.

FIG. 6 is a block diagram of a side port subsystem according to an embodiment. The following labeled section provide implementation details according to various embodiments with reference to FIG. 6, but the claimed invention is not limited to the specific details described.

Host PCIe® Endpoint

In an embodiment, the host PCIe® interface is made up of Bus Interface core logic (BIF), an analog PHY, and a wrapper. The interface is configured as an Endpoint (EP). The bus operates at the standard PCI Express 2.0 specification ("PCIe2®") rate of 5 Gbps per pin, or a theoretical maximum rate of 8 GB/sec for a 16-lane interface. The bus has a 128 b credit/debit master interface for outgoing memory writes (to host or peer), and a 128 b credit/debit slave interface for incoming memory writes (from host or peer). The bus has 32 b interfaces to read only memory (ROM), internal register bus, audio, and video graphics array (VGA). The bus routes host requests to the multiple GPU destinations over its slave interface (labeled S).

Request interfaces have accompanying completion interfaces. The BIF directs traffic with a set of address apertures: one for frame buffer, one for registers, and one for ROM. It uses a 32 b interface for configuration registers and straps. It also has an interface to the clock generator (CG) to handle ACPI power state management, clock, reset and scan inputs, and a debug bus daisy chain interface. It also has an interface to the host data path block (HDP) for framebuffer reads and writes.

Side Port Root Complex

The PCI Express logic used for the side port (XSP) is configured as a Root Complex (RC). There are small differences in configuration and capabilities between RC and EP modes of operation. The XSP bus operates at the standard PCIe2® spec rate of 0.5 Gbps per pin, or a theoretical maximum rate of 8 GB/sec for a 16-lane interface. It has a 128-data-bit credit/debit master interface used for outgoing memory controller (MC) memory space write requests to the peer GPU, and a 128 b credit/debit slave interface for incoming memory writes from the peer GPU. These are the interfaces used by HDP on the host BIF instance. It uses a 32 b interface for configuration registers and straps. It maintains its own link power states separately from the host interface. As with the host interface, the number of lanes can be software programmed to be 8 or 16. Because two PCIe® PHYs on an application specific integrated circuit (ASIC) run at the same rate, a single pair of reference clock (REFCLK) input pins can be used, with the buffered REFCLK distributed on-die to the two PHYs.

The XSP instance does not need any of the other read/write interfaces or interrupt handling supported by the host BIF. The side port does not need to be activated at ASIC power up, so for the most part it does not use pin-based straps. The configuration of the side port is programmable separately from the host interface via software register writes over the SRBM bus.

The XSP does not need to support register reads or writes, I/O space, or configuration space cycles. Only a single PCIe® Function is required to be operable on this device. In an embodiment where only posted writes are issued (no reads at all), and a global synchronization scheme is used, completion messages are not necessary.

The MC hub routes write requests to the XSP. The same addresses are used for XSP requests as for host BIF requests.

Host Data Path Block

In an embodiment, the host data path block (HDP) is a standard block that is part of the BusIP. The HDP handles frame buffer reads and writes performed by the host interface. In multi-GPU systems frame buffer reads and writes can come from either the host or from peer-to-peer writes initiated by another GPU. Host accesses may use one of multiple HDP tiling apertures, while peer to peer accesses may or may not (peers can be distinguished by requester ID). The HDP interfaces to the host BIF's slave port and to the MC as a read and write client. The BIF and HDP cooperate to maintain read to write coherency; a read cannot pass preceding writes. For peer-to-peer write synchronization, a special write to a reserved memory address is recognized by the HDP and triggers an MC read and a flush of preceding writes for a particular "write phase" all the way to local memory, followed by a writeback to a phase-specific mailbox in the sending client's register space.

Incoming reads and writes from the bus are routed to the HDP by a special aperture in the BIF. This aperture corresponds to 32 MB or more of local memory. Optionally the addresses handled by the HDP are treated as virtual addresses and looked up in a page table dedicated to HDP.

To make best use of the available PCIe® aperture for each GPU and to support write phases, peer-to-peer write addresses are encoded by the MC of the sending GPU as phase and offset, and may have automatic per-phase base address register (BAR) updates interspersed. The HDP uses a combination of a requester ID from the BIF plus transmitted bits to determine which write phase and dynamic address aperture to use.

Memory Controller (MC) Block

The MC has two interfaces for connecting to the side port: a 128 b BIF master interface for writes requested by MC clients; and a 128 b BIF slave interface for incoming writes to local memory from the other GPU. The MC also incorporates addressing logic to route master requests to peer memory via the XSP. A XDP block handles the interface functions. It looks at slave requests and does either address offsetting or video memory (VM) lookup, it maintains write completion counters, and it provides write combining (32 B BIF requests to 64 B MC requests).

Requests to and from the side port can be from 16 bytes (with masking) to 64 bytes. For best performance requests should be 64 B.

The side port BIF interfaces pass GART-translated 40 b system addresses whether or not full graphics virtual memory is active. The GART is the same as system context domain, performing translations from 36-bit GPU device addresses.

The MC maintains write completion status in a way that allows for multi-GPU guaranteed flushing of copy operations. Similar to the HDP, a special address that is recognized by XDP is used to trigger a check for write completion of a particular write phase, and to generate a writeback to a mailbox in the sending client's register space.

Direct Memory Access Engine (DRMDAM)

The GPU with side port includes a DMA engine that can perform efficient host block transfers (BLTs) of memory. The DRMDMA can be programmed to transfer between any two of local memory, host memory, and another GPU's local memory. With enhancements to the handling of addresses (further described below) the DRMDMA can also move blocks of memory utilizing both the XSP and the PCIe®bridge. The standard transfer capabilities of an embodiment include:

Host to local (host BLT or copy)—16 B per clock peak rate
Fill local with a constant value—32 B per clock peak rate
Local to host (copy)—16 B per clock peak rate
Local to remote GPU (copy)—32 B per clock peak rate to neighbor GPU, 16 B per clock peak rate to non-neighbor The DRMDMA can sustain a 32 B read and 32 B write per clock, which matches two 16 B PCIe® write interfaces.

Host vs. Side Port Load Balancing

Adding a side port allows greater bandwidth to the neighbor GPU, which is where most of the bandwidth is needed for the 2 GPU & 4 GPU usage models. The host port has a lot of bandwidth available as well, and should still be usable for communicating with the neighbor GPU.

The simplest method of load balancing involves statically assigning the port used to transfer data based on a fixed assignment to different clients—for example, DRMDMA assigned to side port and Color Buffer block assigned to host port.

A second method of load balancing involves dynamically routing traffic from any client to either of the two ports based on how heavily the side port is used. See description of "ANY" load balancing below.

Using the second method above, there may be a race condition for writes to the same pixel address over two different paths. This can violate the pixel ordering rule when the writes belong to two different primitives. The write for an earlier primitive can arrive after the write for a later primitive. An option to route based on address is supported to solve this problem. A fallback method is to use a single path for the relevant client.

If peer write requests (reqs) are being sent to the neighbor via host and side port, request order can be lost because of differing and variable latencies across these 2 ports. The host port could even be stalled in some circumstances. This means that steps should be taken to ensure that request ordering is preserved when needed.

The only ordering guarantee from the MC is that writes to the same address from the same client will not be reordered. So, this is the only Write after Write (WAW) requirement for peer writes as well. There are several ways to guarantee this according to embodiments. The MC handles reads/writes to local memory as well as to host and peer. The default MC ordering rule is as stated. The additional routing rules and the bus itself provide additional ordering guarantees. All load balancing only applies to requests going to the neighbor GPU. This is determined by an aperture check, and non-neighbor requests will all go to the host port.

Load Balancing: Fixed Mapping to Ports ("FXD")

One way to ensure that two writes to the same address do not get out of order is to load balance by address checking. An address check is performed to ensure that a given address always uses the same port. For example, for a certain granularity, "even" addresses would always use host port and "odd" addresses would always use the side port. This way, 2 requests to the same address cannot get out of order while crossing the ports.

The address check mapping used is programmable as to which address bits are looked at, and what threshold to use for balancing. The address bits used set the granularity of balancing, since larger granularity would probably mean write bursts stay together across one port or the other, while too large of a granularity could result in a port starving while large bursts are sent to one port or another. The threshold used allows finer ratios of balancing between host and side ports. For example, if three address bits are used, the ratio of host:side could be 0:8, 1:7, 2:6, . . . , 7:1, 8:0, depending on the threshold used. Sending all requests to only the host port or only side port is a degenerate case of this fixed mapping.

With this type of fixed load balancing, if a port (host) gets very busy or stalled, the backup can throttle the bandwidth that can be sent to the other (side) port. Also, certain write patterns can easily cause the desired balance ratio to be ruined (an example is striding writes that always map to one port, leaving other port unused). Thus there are undesirable characteristics of this load balancing is method due to its being static, and software programmed, rather then reactive to the bandwidth available. Dynamic load balancing alternatives are discussed below.

Load Balancing: Unconstrained or any Ordering where WAW is not Guaranteed ("ANY")

ANY load balancing switches between ports based on full or almost-full conditions. The side port should end up being preferred due to expected higher availability. Control over the number of outstanding credits on each port should be provided to tune the balancing. Some clients do not need the WAW coherency guarantee. For example, since copies do not transfer the same address twice in the same copy, coherency can be guaranteed by flushing between copies. Support for this will allow source & destination to proceed at full speed, only needing to do the normal write completion synchronization between potentially overlapping transfers. Mixing this traffic with ANY type of traffic can also alleviate some of their respective weaknesses, potentially allowing these writes to fill in any gaps. The side port will be used as much as possible, with the host port only being used when side port is full.

Any and/or all implemented methods of load balancing can be in concurrent use for independent streams of transfers. Software can configure what type of load balancing to use per phase.

If there is a mix of the ANY traffic with FXD traffic, then the ANY traffic should help to fill in any bubbles caused by the weaknesses of the FXD options. The hardware has support to let these ANY type of requests bypass some stalled or waiting FXD requests.

FXD and ANY are the only two load balancing modes supported, but many other embodiments are possible.

Load Balancing: Possible Usage Scenarios

The following are possible usage models, but embodiments are not so limited.

1) Peer writes are DMAs: 1-2 phases being used by DRM-DMA to copy data to peer GPU(s).

1a) "ANY" type of load balancing can be used for the transfer(s), but that may require additional synchronization between any DMAs that are at risk of overlapping. Software can check to determine whether overlap occurs.

1b) An alternate load balancing option for two DMA engines is to have one engine using "host_only" an one engine using "side_only". Or, the "host_only" might be implied by writes to a non-neighboring peer. The bandwidth available for the host port is not guaranteed so it may be difficult for software to optimally divide up the copy work, but if two phases hide the synchronization latency, then this would keep both ports full without requiring any additional synchronization between any potentially overlapping copies. Hardware could allow host_only phase and side_only phases to use the same phase number if related resources did not overlap.

2) WAW sensitive client writing (with or without copies also being used):

2a) Similar to 1b above, if one or more peer writes are being sent, each could be assigned a dedicated path of "host_only" or "peer_only" so that both ports are fully used and there are no ordering dependencies or cross-coupled backpressure paths between ports.

2b) If this WAW-sensitive client is the only client doing transfers, only then does "FXD" need to be used to keep the ports fully utilized, with "side_only" being a safe backup if the others are problematic (and/or if another client may be able to use "host_only" for part of the time).

Addressing

A GPU's host interface receives bus requests for registers (mapped in memory space) and for local memory (frame buffer) as well as for other blocks. A set of apertures (or address ranges) within the BIF map PCIe® space addresses (64 b) to the particular destination within the GPU. Local memory reads and writes go through the HDP on their way to the MC.

GPU originated memory requests use addresses that may or may not be virtual addresses. For Windows XP or Vista graphics driver models, GPU "device" addresses form an aperture-regioned flat address space that contains system memory (which may be further mapped via a GART) or local memory. For future driver models, GPU addresses are treated as page-mapped virtual addresses, and the looked-up physical addresses are separate for system memory and local memory.

System Memory Space

From the point of view of the GPU, system memory typically means dynamic random access memory (DRAM) attached to the CPU, but in practice system memory includes any memory space belonging to any accessible memory-mapped devices, particularly other GPU memory. The mapping and routing of system memory accesses is handled by a combination of discrete bridges and the bridges of the chipset (for example a Northbridge) depending on the system configuration.

Seen from the CPU, physical address space (32 b or 64 b) is partitioned into true system memory attached to the CPU and "other" memory, the latter being any memory present on memory-mapped devices (i.e. on the PCIe® bus). This partitioning is done via a single base-limit configuration register pair in the topmost node of the input/output (I/O) system. There is also another pair for register space. At each level of the binary tree below that, the bus address range is split into two with a base-limit pair for each downstream leg. The aperture size of a GPU is set by a board strap. Today this size holds for both 32 b and 64 b operating systems, and holds regardless of how many GPUs are intended to be inserted into the system.

Seen from a GPU, system addresses map to bus address space either through a GART (system page table) or directly, with ungenerated most significant bits (MSBs) set to 0. Each upstream PCIe® bridge node checks against a base-limit pair to route either further upstream or to the peer connection.

Figure 7A:
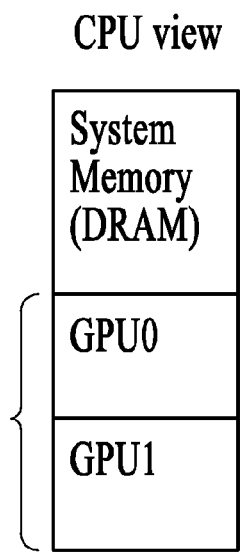
FIGS. 7A-7C show high level diagrams of system memory space where
Figure 7B:
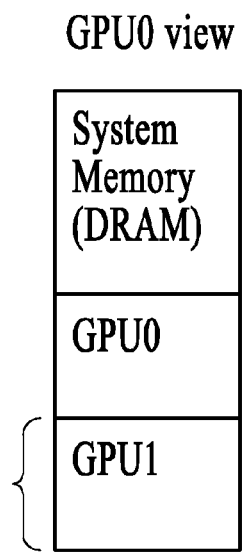
Figure 7C:
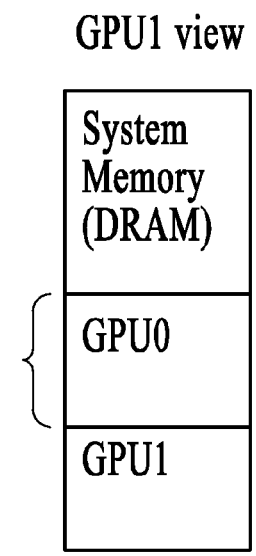

FIG. 7 shows a high level diagram of system memory space with two GPUs, showing and how each entity views it. FIG. 7A is a CPU view, FIG. 7B is a GPU0 view, and FIG. 7C is a GPU1 view.

Video Memory Disabled

The 36-bit addresses presented to the MC by the GPU undergo the following sequence of operations:
1. Check against local memory aperture. If the address falls inside this range the base address is subtracted off and used as a physical local memory address.
2. If outside the local memory aperture check against side port memory aperture. This generally corresponds to the address range used by the neighbor GPU. If the address falls inside this range it is used unmodified on either the side port or the host interface depending on load. If it goes to the side port the remote GPU client will do its own aperture check, and this check should result in passing within the local memory aperture. If it goes to the host interface the aperture check in the bridge or northbridge will route the request to the remote GPU. The remote host interface will pass these requests to its HDP or SRBM.
3. If the address falls outside the previous two apertures it is a system address. If it falls inside the non-snooped aperture it is passed to the host interface unmodified. Otherwise it is looked up in the system GART (e.g. system page table) and then passed to the host interface.

Video Memory Enabled

GPU addresses are treated as virtual and are translated in the VM by page tables to system physical addresses or local video memory addresses. Traditionally system physical addresses are 40 b and the destination of requests is always the host interface (after passing through a GART—really the system page table). However, to support use of both the host interface and the side port for peer to peer transfers, embodiments allow routing of system physical addresses across the side port as well. Here is the sequence according to an embodiment.
1. Requests made by the GPU client (e.g. DMA engine) are looked up in the appropriate page table.
2. If the "S" bit (for system space) in the PTE is not set, the local memory of the requesting GPU is accessed.
3. If the "S" bit is set, the Side Port Aperture address range check is performed.
4. If the address is outside the SPA the request goes to the host interface (after GART lookup)
5. If the address is inside the SPA a load balancing decision is made, and the request is routed either to the side port or to the host interface.
6. If the request is routed via the host interface, it is a normal peer to peer request as performed today.
7. If the request is routed via the side port, the system address is passed to the remote GPU, where it is looked up in the HDP space page table, where it is (almost always) mapped to a local physical memory address.

Synchronization

Rendering using multiple GPUs requires synchronization between drawing and data movement steps to ensure data consistency. Separate command streams perform the drawing and copies. The typical sequence for alternate frame rendering (AFR) is
1. 3D engine on GPU0 draws to dynamic or persistent texture surface
2. 3D engine flushes and signals completion (issues semaphore Signal command)
3. Copy engine on GPU0 waits for semaphore, then copies results to GPU1
4. Copy engine flushes and signals completion
5. 3D engine on GPU1 waits for semaphore, then draws using rendered texture The BIF and MC (as well as the northbridge and CPU memory system) each have their own coherency rules for the ordering of read and write operations. In order to maintain end-to-end request to destination consistency among multiple GPUs without software intervention requires a synchronization scheme that takes all of these rules into account (or does not depend on them).

Synchronization needs for multi GPU are similar to those for a single GPU with the additional step of DMAs of surface data between the two. In this DMA case and in the case of broadcast write capability, there is the problem of guaranteeing to a client on one GPU that writes have completed on another. The MC and semaphore block help with this task.

Aperture Compression

One challenge in designing efficient GPU systems is that as the number of GPUs and the amount of local memory with each GPU increase, the ability to fit everything into the system memory space is compromised, and the device aperture has to be reduced in size. If the amount of GPU local memory mappable into system space is limited, the usefulness of the unmapped memory is limited to the local GPU. There is not a large concern with having a limited range of CPU-mappable GPU space; the fallback is to copy surfaces to system memory instead of locked access to local video memory.

A solution according to an embodiment makes the rest of local memory accessible to a peer by adding an offset register (a P2P BAR). When the destination BIF sees a write request from that source, after applying the memory aperture that produces a 36 b device address for HDP, the offset is added (at 4 KB page granularity). The amount of contiguous local virtual memory space the source can see is no bigger than it was before, but this is now a window into all of the local memory that can be changed by rewriting the P2P BAR. Theoretically the BAR can be moved at any time as long as changes are ordered within the write stream. Note also that multiple offsets do not all need to synchronized or spatially separate as long as they can be distinguished by source (e.g. write phase).

Figure 8A:
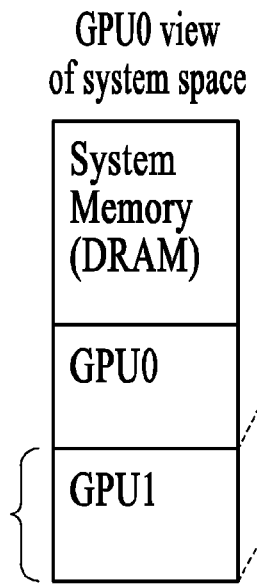
FIGS. 8A-8C show diagrams of memory space with offsets where
Figure 8B:
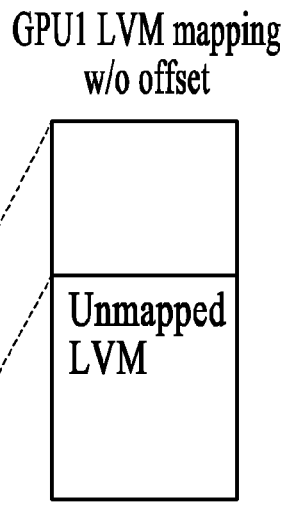
Figure 8C:
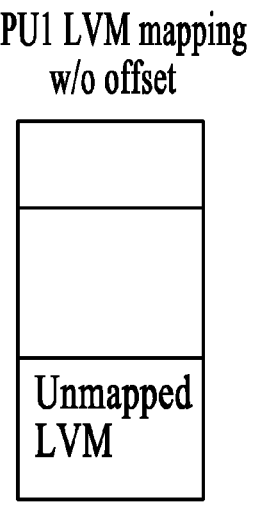

FIG. 8 is a diagram of memory space with offsets. FIG. 8A is a GPU0 view of the system memory space, FIG. 8B is a GPU1 LVM mapping without offset, and FIG. 8C is a GPU1 mapping with offset.

Write Phase

It is desirable to guarantee write completion when a single GPU issues multiple sets of writes; either multiple sets of write traffic in flight at the same time (e.g. 3D pipe and DRMDMA copy), or back to back sets of writes from the same client. The goal in the latter case is to hide the latency of the flush/sync operation. Secondarily, it is also desirable to allow multiple source GPUs to write to a single destination GPU and track completion separately for each source.

According to an embodiment that provides for the desired outcomes, the (destination) BIF is given 8 sets of base/limit registers (Phase Range) with a 3-bit phase ID for each set. These could be written by the source GPUs in a variety of ways. For example:

Each of up to 8 GPUs could reserve one Phase Range for its exclusive use. Having the ranges on a single destination GPU overlap would be ambiguous ("crossing the streams"). A better scheme would be to just let phase be determined by the PCIe® sourceID, which removes any overlap restriction.

Each of up to 4 GPUs can reserve two non-overlapping Phase Ranges.

Each of 2 GPUs can use all 8 Phase Ranges (but really only 2 per GPU source are thought to be useful).

In an embodiment, there are seven sources of traffic in a single GPU that could be assigned to distinct phases Color Buffer block or Depth Buffer block Shader Export block Command Processor DRMDMA (2 alternating phases)

Thus the final phase value should be a combination of sourceID and range check results depending on the number of GPUs in the system.

Combining Write Phase and Small Apertures

It is possible to allow both of these features (write phase and small apertures) at the same time. That is, it is possible to allow a source GPU to see all of a destination surface and have multiple sources per GPU. An embodiment uses a P2P BAR per phase. This provides the ability to have multiple phases used by a single source GPU where the destination addresses are too far apart to fit in a single aperture. However, selecting a P2P BAR may be problematic because the PCIe® space aperture is not big enough for a range check at the destination to work.

One solution is to replicate the Phase Range registers and comparisons on the sending side, and use comparison results to; a) transmit the resulting phase information along with an offset from the per-phase P2P BAR; and b) update the P2P BAR when a request is out of range of the current range for that phase. The P2P aperture size is fixed ahead of time via a separate global register. The way the BAR moves incorporates some amount of hysteresis to minimize the frequency of update.

The second part of the solution involves making use of the expanded (36 b) virtual space to allow the possibility of mapping all of remote GPU memory, and an exploded view of PCIe® space going into the source BIF. However, the maximum size of a surface that can be addressed without changing the P2P BAR is reduced due to the need to transmit phase bits. Note that the real PCIe® aperture for a GPU need not have any particular alignment; the phase is determined (at the cost of additional comparators on the destination side) by having 1/n partitions of the available address range to a reasonable granularity. Note it is assumed that any scatter-gather of physical surface pages is done in the destination HDP page table or GART, so that within the PCIe® space surface addresses are contiguous.

FIG. 9 is a diagram illustrating how phase compression works. Only two phases are shown. It is assumes there is 256 MB of local memory and only a 128 MB PCIe® aperture per GPU. FIG. 9A is a GPU0 view of system memory space (GPU virtual memory space. FIG. 9B is a PCIe® view of system memory space (Fabric Physical memory space). FIG. 9C is a GPU1 reconstituted view of LVM (HDP memory space).

To make fullest use of the limited PCIe® aperture size, the use of multiple phases from the same source GPU can be turned off. Note a typical large surface is 2K×2K×32 b/component, or 64 MB. This would just fit in a 512 MB/8 GPU aperture. In an embodiment, the application of the aperture encoding is just in advance of the sending BIF.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

The term "processor" as used in the specification and claims includes a processor core or a portion of a processor. Further, although one or more GPUs and one or more CPUs are usually referred to separately herein, in embodiments both a GPU and a CPU are included in a single integrated circuit package or on a single monolithic die. Therefore a single device performs the claimed method in such embodiments.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. The claimed invention may be embodied in computer code (e.g., HDL, Verilog, etc.) that is created, stored, synthesized, and used to generate GDSII data (or its equivalent). An ASIC may then be manufactured based on this data.

Accordingly, the inventors reserve the right to add additional claims after filing the application to pursue such additional claim forms for other aspects of the method and system.

What is claimed is:

1. A system comprising:
    a plurality of special purpose processors;
    a host bridge bus coupling each of the plurality of special purpose processors to at least one other of the plurality of special purpose processors through a bridge;
    a direct bus directly coupling each of the plurality of special purpose processors to at least one other of the plurality of special purpose processors;
    at least one local memory;
    at least one system memory;
    at least one peer memory; and
    a memory controller coupled to each of the plurality of special purpose processors;
    wherein the memory controller is configured to determine whether to transfer data via the host bridge bus or via the direct bus, and
    configured to determine which memory to access based on address ranges of the respective memories; and
    wherein when an address falls in a range of the peer memory, the memory controller is further configured to determine which bus to use based on the amount of traffic on each of the host bridge bus and the direct bus.

2. The system of claim 1, wherein the memory controller resides on at least one of the plurality of special purpose processors.

3. The system of claim 1, wherein the plurality of special purpose processors comprise graphics processing units (GPUs).

4. The system of claim 1, wherein the host bus comprises a peripheral component interface express (PCIe®) bus.

5. The system of claim 1, wherein the direct bus comprises a peripheral component interface express (PCIe®) bus.

6. The system of claim 1, wherein the direct bus comprises a proprietary bus.

7. The system of claim 1, wherein when an address falls in a range of the peer memory, the memory controller is further configured to determine which bus to use based on whether one of the host bridge bus and the direct bus is currently full.

8. The system of claim 1, wherein when an address falls in a range of the peer memory, the memory controller is further configured to determine which bus to use based on fixed mapping to either the host bridge bus or the direct bus.

9. The system of claim 1 wherein the memory controller further performs dynamic load balancing based on traffic on each of the host bus and the direct bus.

10. A method of communicating data in a multi-processor system, the method comprising:
    determining whether to transmit or receive data via a host bridge bus that is shared with a host processor and a plurality of special purpose processors, or via a direct bus directly coupling the plurality of special purpose processors, wherein determining depends upon a memory address range of a transmission, wherein when an address is within the range specifying the peer memory, the determination is made based on the amount of traffic on each of the host bridge bus and the direct bus.

11. The method of claim 10, wherein the address ranges specify one of a peer memory resident on a special purpose processor, a system memory on the host bus, and a local memory coupled between the special purpose processors.

12. The method of claim 11, wherein specific addresses within the range specifying the peer memory are assigned to on one of the host bus or the direct bus.

13. The method of claim 11, further comprising performing dynamic load balancing to adjust the percentage traffic on each of the host bus and the direct bus based on historical traffic data.

14. The method of claim 11, further comprising assigning memory apertures to the host processor and each of the plurality of special purpose processors, wherein the memory apertures apply to the peer memory, the system memory, and the local memory, and the aperture determines how a respective processor views memory.

15. The method of claim 14, further comprising performing aperture compression, including using an offset register to make visible all of the peer memory by changing the offset.

16. A computer readable medium having stored thereon instructions that when executed cause a method of communicating data in a multi-processor system to be performed, the method comprising:
    determining whether to transmit or receive data via a host bridge bus that is shared with a host processor and a plurality of special purpose processors, or via a direct bus directly coupling the plurality of special purpose processors, wherein determining depends upon a memory address range of a transmission, wherein the address ranges specify one of a peer memory resident on a special purpose processor, a system memory on the host bus, and a local memory coupled to the special purpose processor, and wherein when an address is within the range specifying the peer memory, the determination is made based on the amount of traffic on each of the host bridge bus and the direct bus.

17. The computer readable medium of claim 16, wherein specific addresses within the range specifying the peer memory are assigned to on one of the host bus or the direct bus.

18. The computer readable medium of claim 16, wherein the method further comprises performing dynamic load balancing to adjust the percentage traffic on each of the host bus and the direct bus based on historical traffic data.

19. The computer readable medium of claim 16, wherein the method further comprises assigning memory apertures to the host processor and each of the plurality of special purpose processors, wherein the memory apertures apply to the peer memory, the system memory, and the local memory, and the aperture determines how a respective processor views memory.

20. The computer readable medium of claim 19, wherein the method further comprises performing aperture compression, including using an offset register to make visible all of the local memory by changing the offset.

21. The computer readable medium of claim 16, wherein the instructions comprise hardware description language instructions that are usable to create an application specific integrated circuit (ASIC) to perform the method.

* * * * *